United States Patent [19]

Brändle et al.

[11] Patent Number: 5,389,354
[45] Date of Patent: Feb. 14, 1995

[54] PROCESS FOR THE PRODUCTION OF OLEUM AND SULFURIC ACID

[75] Inventors: Karl Brändle, Bergisch Gladbach; Kurt-Wilhelm Eichenhofer, Leverkusen; Klaus Geisler, Bergisch Gladbach; Günter Pütz, Leverkusen; Klaus-P. Grabowski, Wermelskirchen, all of Germany

[73] Assignee: Bayer Aktiengesellschaft, Leverkusen, Germany

[21] Appl. No.: 643,392

[22] Filed: Jan. 18, 1991

[30] Foreign Application Priority Data

Jan. 28, 1990 [DE] Germany .................... 4002465

[51] Int. Cl.$^6$ .................... C01B 17/69; C01B 17/79
[52] U.S. Cl. .................... 423/522; 423/523; 423/535; 423/540; 423/543; 423/244.10; 423/235
[58] Field of Search ............ 423/400, 523, 531, 543, 423/535, 522, 540, 235 D, 244.10

[56] References Cited

U.S. PATENT DOCUMENTS

| | | | |
|---|---|---|---|
| 1,713,416 | 5/1929 | Boertlein | 423/543 |
| 1,822,447 | 9/1931 | Merriam | 423/523 |
| 2,562,240 | 7/1951 | Merriam | 423/523 |
| 3,359,069 | 12/1967 | Furkert et al. | 423/540 |
| 3,443,896 | 5/1969 | Furkert | 423/533 |
| 3,475,120 | 10/1969 | Maurer | 423/535 |
| 4,088,742 | 5/1978 | Homme, Jr. | 423/522 |
| 4,148,868 | 4/1979 | Fattinger | 423/523 |
| 4,328,194 | 5/1982 | Samish | 423/235 |
| 4,539,309 | 9/1985 | Meissner | 502/247 |
| 4,578,262 | 3/1986 | Cameron | 423/522 |

FOREIGN PATENT DOCUMENTS

| | | |
|---|---|---|
| 1198261 | 12/1985 | Canada. |
| 0071078 | 2/1983 | European Pat. Off.. |
| 0244206 | 11/1987 | European Pat. Off.. |
| 2162185 | 7/1973 | France. |
| 53-52291 | 5/1978 | Japan .................... 423/523 |

OTHER PUBLICATIONS

C.P.I. 'Chemical Engineering Series' by R. Norris Schreve 3rd ed., McGraw-Hill New York, 1967 p. 327.
Sulphur, Sulphur–Dioxide, Sulphuric Acid, An Introduction to Industrial Chemistry and Technology, The British Sulphur Corp., Ltd., U. Sander et al 1984, pp. 168–176 & 289–293.
U.H.F. Sander et al.: "Sulphur, sulpur dioxide and sulphuric acid" No. 170770 1984, British Sulphur Corp./Verlag Chemie Int., London (GB) pp. 371–371.
Chemical Abstracts, vol. 110, No. 14, Apr. 3, 1989 Columbus, Ohio USA L. Kaszub et al: "Method of combustion sulfur to sulfur dioxide" p. 170, ref No. 117656 Z Zusammenfassung.

Primary Examiner—Gary P. Straub
Assistant Examiner—Timothy C. Vanoy
Attorney, Agent, or Firm—Sprung Horn Kramer & Woods

[57] ABSTRACT

In the continuous production of oleum having a concentration of 10 to 45% by weight SO$_3$ and/or sulfuric acid having a concentration of 94 to 100% by weight H$_2$SO$_4$ by burning sulfur with atmospheric oxygen on the principle of overstoichiometric or understoichiometric burning, cooling the resulting SO$_2$-containing gas to 390°–480° C., catalytically reacting the cooled gas to SO$_3$-containing gas on a vanadium-containing catalyst on the principle of single- or double-contact catalysis, absorbing the SO$_3$-containing gas after cooling and, optionally, separating liquid from the gas after absorption, followed by recovering energy, the improvement which comprises effecting the burning of the sulfur with atmospheric oxygen in the presence of a dry SO$_2$-containing gas which contains up to 5,000 ppm (NO)$_x$ expressed as NO.

14 Claims, 1 Drawing Sheet

5,389,354

PROCESS FOR THE PRODUCTION OF OLEUM AND SULFURIC ACID

BACKGROUND OF THE INVENTION

This invention relates to a process for the production of oleum having a concentration of 10 to 45% by weight $SO_3$ and/or sulfuric acid having a concentration of 96 to 100% by weight $H_2SO_4$ by burning of sulfur with atmospheric oxygen, reaction of the $SO_2$-containing gases to $SO_3$-containing gases on vanadium catalysts and absorption of the $SO_3$-containing gases for the production of oleum and/or sulfuric acid.

Various processes for the production of oleum and sulfuric acid are known from, and described in detail in, the literature.

In the thermal processes (burning of sulfur with atmospheric oxygen, roasting of pyrites, cleavage of sulfuric acid), nitrogen oxides $(NO)_x$ are formed in addition to gases containing sulfur dioxide. These nitrogen oxides are absorbed in the same way as the gases containing sulfur trioxide which are formed from the $SO_2$-containing gases on the vanadium catalyst, so that the sulfuric acid formed or the oleum is contaminated with absorbed $(NO)_x$. For many applications, however, the sulfuric acid or the oleum should be free from absorbed $(NO)_x$. In addition, the $(NO)_x$ absorbed in oleum or sulfuric acid leads to increased corrosion of steel parts in the sulfuric acid plants. Accordingly, there has been no shortage of attempts to remove the impurities from the sulfuric acid or oleum.

Thus, sulfuric acid free from nitrous vitriol and having a concentration of >80% by weight can be produced by addition of hydrazine compounds at 50° to 100° C. (DE-OS 1 792 348). Although the process of adding aqueous hydrazine sulfate solutions is basically suitable, it has been found that secondary reactions involving hydrazine sulfate take place at relatively high contents of absorbed $(NO)_x$ and merely create a false impression of a reduction in the $(NO)_x$ content. In addition, this process is very expensive.

In addition, it is known that monomeric or polymeric compounds containing $NH_2$ groups are added to remove nitrous acid from waste sulfuric acids (DE-OS 2 831 941). Hydroxylammonium sulfate, urea or amidosulfonic acid are preferably used as suitable compounds. However, this process can only be carried out for sulfuric acids having a concentration of approximately 50 to 90% by weight. In addition, the use of the particularly active amidosulfonic acid, for example, involves high costs. Moreover, considerable effort is involved in the two above-mentioned processes in analyzing the sulfuric acid to monitor its nitrogen content in order to avoid under- or overdosage of the compounds added.

Accordingly, the problem addressed by the present invention was to reduce the content of nitrous gases formed during the burning of sulfur for the production of oleum and/or sulfuric acid and absorbed in oleum and/or sulfuric acid.

This problem has now been solved by the process according to the invention.

SUMMARY OF THE INVENTION

The present invention relates to a process for the continuous production of oleum having a concentration of 10 to 45% by weight $SO_3$ and/or sulfuric acid having a concentration of 94 to 100% by weight $H_2SO_4$ by burning of sulfur with atmospheric oxygen on the principle of overstoichiometric or understoichiometric burning, cooling of the resulting $SO_2$-containing gases to 390°–480° C., catalytic reaction of the cooled gases to $SO_3$-containing gases on a vanadium-containing catalyst on the principle of single- or double-contact catalysis, absorption of the $SO_3$-containing gases after cooling and, optionally, separation of liquids from the gases after absorption, followed by energy recovery, characterized in that the burning of sulfur with atmospheric oxygen is carried out with addition of dry $SO_2$-containing gases which contain up to 5,000 ppm $(NO)_x$ and preferably less than 2,000 ppm $(NO)_x$, expressed as NO.

The dry $SO_2$-containing gases normally contain more than 50 ppm $(NO)_x$, expressed as NO.

Dry cleavage gases from the thermal cleavage of waste sulfuric acids are preferably used as the $SO_2$-containing dry gases which may contain up to 5,000 ppm $(NO)_x$, expressed as NO. These cleavage gases preferably contain 5 to 10% by volume $O_2$, 5 to 8% by volume $SO_2$, <200 ppm CO, <1,000 ppm $(NO)_x$, <50 ppm hydrocarbon compounds and 82 to 90% by volume $H_2O$, $N_2$ and $CO_2$.

In another variant of the process, combustion gases from the burning of sulfur-containing materials are used as the $SO_2$-containing dry gases which may contain up to 5,000 ppm $(NO)_x$.

The ratio between the quantity of $SO_2$ from the dry $SO_2$-containing gases added and the quantity of $SO_2$ formed from the burning of sulfur is preferably from 1:5 and 3:1.

To carry out the process in accordance with the invention, the dry $SO_2$-containing gases which may contain up to 5,000 ppm $(NO)_x$ may be directly introduced into the furnace chamber in which sulfur is burnt with oxygen or may be introduced into the furnace chamber after mixing with combustion air. It is important that the $SO_2$-containing gases which may contain up to 5,000 ppm $(NO)_x$ (nitrous-vitriol-containing $SO_2$-containing gases) are burnt together with the sulfur. Up to 95% by weight of the total nitrogen oxides can be removed by the process according to the invention.

DESCRIPTION OF THE PREFERRED EMBODIMENTS

In one preferred embodiment of the process, the sulfur is burnt at temperatures in the range from 500° C. to 1,000° C. (as measured at the exit of the furnace chamber before cooling of the gases) and preferably at temperatures in the range from 700° C. to 950° C.

The $SO_3$-containing gases are preferably absorbed in oleum having a concentration of 15 to 45% by weight $SO_3$ and preferably 20 to 30% by weight $SO_3$.

The energy released during the burning of sulfur may be recovered in the usual way with formation of wet steam at different pressure stages.

The liquids removed from the gases after absorption may be recycled to sulfuric acid processing plants, preferably sulfuric acid cleavage plants.

The catalysis conditions in the practical application of the process are not critical. The known methods of regulating concentration may be used for the absorption of $SO_3$ to oleum.

BRIEF DESCRIPTION OF THE DRAWING

The figure is a flow sheet of one possible embodiment of the process according to the invention although the process according to the invention is by no means limited to this embodiment. The reference numerals identify the following elements:

Figure 1:
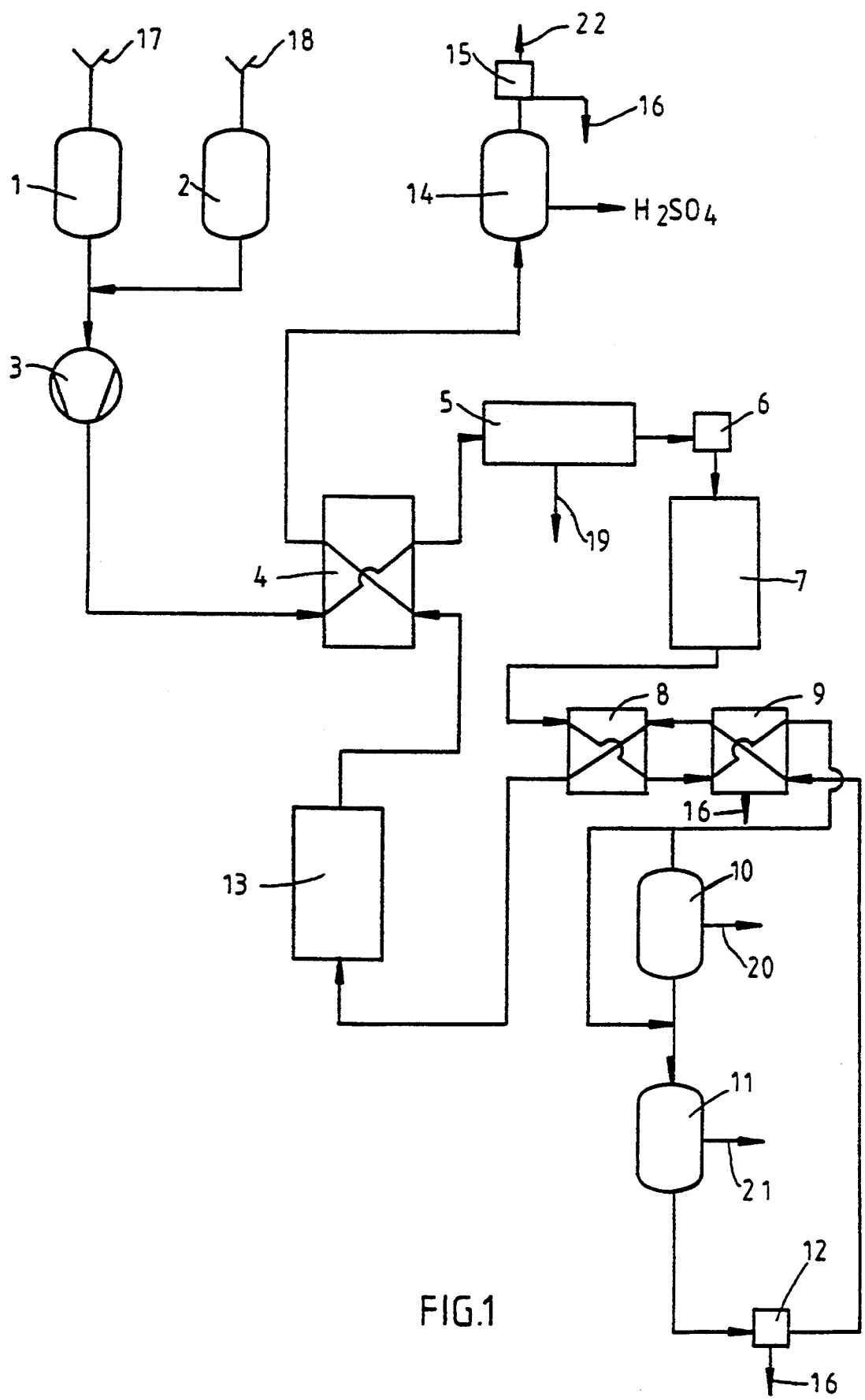

| | |
|---|---|
| 1 | air dry (drying tower) |
| 2 | gas dryer (drying tower |
| 3 | fan (blower) |
| 4 | heat exchanger |
| 5 | sulfur burner |
| 6 | heat exchanger |
| 7 | primary catalyst (pre-contact 3 bed converter) |
| 8 | heat exchanger |
| 9 | waste heat exchanger |
| 10 | oleum absorber |
| 11 | intermediate absorber |
| 12 | filter (mist eliminator) |
| 13 | secondary catalyst (post-contact) |
| 14 | final absorber |
| 15 | filter (mist eliminator) |
| 16 | liquid |
| 17 | air |
| 18 | $SO_2$-containing gas |
| 19 | sulfur |
| 20 | oleum |
| 21 | sulfuric acid |
| 22 | flue gas. (off-gas) |

The following examples are intended to illustrate the process according to the invention. without limiting it in any way.

EXAMPLE

Example 1

In an industrial plant for the production of oleum having a concentration of 15 to 38% by weight free $SO_3$ and sulfuric acid having a concentration of 95.5 to 99.0% by weight $H_2SO_4$, which is based on the burning of elemental sulfur on the principle of the overstoichiometric burning of sulfur, the double contact process and double absorption, 18,600 $Nm^3/h$ $SO_2$-containing gas having a temperature of 62° C. and a content of 6.3% by volume $SO_2$, 5.3% by volume $O_2$ and 200 mg $NO/Nm^3$ (remainder $CO_2$ and $N_2$), which has been dried with 96.7% by weight sulfuric acid in a gas dryer, are mixed with air-dried at 42° C. in an air dryer—to form a total gas volume of 46,000 $Nm^3/h$. This mixture is taken in under suction by a fan. The $SO_2$-containing gas mixture is heated to 263° C. in a heat exchanger utilizing the heat from the first and second fixed bed trays is mixed and burnt with 4.42 t/h finely divided liquid sulfur in a sulfur burner. The liquid sulfur is dispersed via a nozzle stock surmounted by a nozzle. The hot gas (920° C.) is cooled to 435° C. and fed to a first catalyst consisting of three fixed-bed trays. The gas entering fixed bed tray 1 has the following composition: 8.5% by volume $SO_2$, 9.5% by volume $O_2$, 38 mg $NO/Nm^3$ (remainder $CO_2$ and $N_2$), corresponding to an NO reduction of 53%.

After leaving the 3rd fixed bed tray with a temperature of 512° C., the $SO_3$- and $SO_2$-containing gas is cooled to 215° C. in another heat exchanger and in a waste heat exchanger. A partial gas stream of approximately 50% is fed to the oleum absorption stage. The composition of the circulating oleum (62° C.) was 20.7% by weight free $SO_3$, 12 ppm N (as determined by the Devarda method) and 28 ppm N (as determined by the Kjeldahl method). The remaining partial gas stream is fed together with the gas stream from the oleum absorption stage to the intermediate absorber in which a sulfuric acid having a concentration of 98.95% by weight $H_2SO_4$ and a temperature of 82° C. is present. The remaining $SO_3$ is completely absorbed there. The remaining $SO_2$-containing gas is brought to a temperature of 440° C. in heat exchangers and oxidized on the secondary catalyst in another fixed bed tray. After reaction of the remaining $SO_2$, the gas leaves the tray at 420° C., is cooled in the heat exchanger and introduced into the final absorber (containing 99.9% by weight $H_2SO_4$ at a temperature of 87° C). After absorption of the $SO_3$, the gas is cleaned in a Brinkmist filter and emitted with an $SO_2$ content of 146 ppm. In the absorbers, the nitrite value is <1 mg/kg oleum or sulfuric acid. The oleum accumulating is fed to the intermediate absorber. The total production of approx. 358 tons $SO_3$ per day is discharged as 98.95% by weight $H_2SO_4$. The liquid of $H_2SO_4$ containing approx. 2.5% nitrosylsulfuric acid which accumulates in the waste heat exchanger in a quantity of approx. 9 1/24 h is delivered together with the filter effluents to the-acid cleavage plant. 14 t/h 30 bar steam/300° C. are produced.

Example 2

As in Example 1, 2.6 t/h liquid sulfur were processed with 25,600 $Nm^3$ $SO_2$-containing gas consisting of 6.4% by volume $SO_2$, 5.0% by volume $O_2$, 200 mg $NO/Nm_3$ (rest $N_2$ and $CO_2$) and with air in a total gas quantity of 47,000 $Nm^3/h$. The furnace temperature in the burner was 760° C. and the composition of the gas (temperature 446° C.) on entering tray 1 was 8.1% by volume $SO_2$, 7.1% by volume $O_2$ and 28 mg $NO/Nm^3$ (rest $N_2$ and $CO_2$), which corresponds to an NO reduction of 74%, based on the NO content of the $SO_2$-containing gas used (the $NO_2$-content is approximately 1 to 2 $mg/Nm^3$). The absorbers had been filled with 26.7% by weight oleum, 99.07% by weight $H_2SO_4$ and 99.04% by weight $H_2SO_4$. The emission comprised 130 ppm $SO_2$. 300 tons $SO_3$ were produced in the form of 99.07% by weight $H_2SO_4$. The output of 30 bar steam was 8.5 t/h.

Example 3

As in Example 1, 4.2 t/h liquid sulfur were processed with 24,400 $Nm^3$ $SO_2$-containing gas consisting of 6.9% by volume $SO_2$, 5.6% by volume $O_2$ and 150 mg $NO/Nm_3$ (rest $N_2$ and $CO_2$) and with air in a total gas quantity of 47,000 $Nm^3/h$. The furnace temperature in the burner was 930° C. and the composition of the gas (temperature 454° C.) on entering tray 1 of the primary catalytst was 9.2% by volume $SO_2$, 8.0% by volume $O_2$ and 27 ppm $NO/Nm^3$, which corresponds to an NO degradation of 65%, based on the NO content of the $SO_2$-containing gas used. The absorbers had been filled with 24.70% by weight oleum containing 7 ppm N (as determined by the Devarda method) and 19 ppm ( as determined by the Kjeldahl method) , 99.05% by weight $H_2SO_4$ and 99.10% by weight $H_2SO_4$. The emission comprised 230 ppm $SO_2$. 400 t $SO_3$/24 h were produced in the form of 99.10% by weight $H_2SO_4$. The output of 30 bar steam was 14 t/h.

Example 4

Production of $SO_2$-containing gases from the cleavage of sulfuric acid

68% by weight waste sulfuric acid, salt content 0.5% by weight, was fed into a lined furnace heated with fuel oil S (1.8% by weight sulfur). The furnace temperature was 1,050° C. The throughputs per unit of time were as follows: air 12,000 $m^3$, fuel oil 1,000 kg, cleavage acid 7,000 kg. At the same time, a waste gas from an intermediate organic production process was introduced in a quantity of 50 m³ per unit of time: $SO_2$ 45% by volume, hydrocarbon compounds 2.5% by volume, $N_2$ and $O_2$ 52.5% by volume. The efficiency of the $H_2SO_4 \rightarrow H_2 + SO_2 + \frac{1}{2}O_2$ reaction is 98% of the theoretical. The gas leaving the cleavage furnace is cooled to 800° C. in a recuperator, the burner air used for cooling being heated to 420° C. In a wet quench, the hot cleavage gas is cooled to 80° C. by introduction of an excess of water. The water deposited is removed by a stripper. The steam-saturated gas with a temperature of approximately 80° C. enters a packed washing tower which may be operated in co-current or countercurrent. A 2% by weight sulfuric acid is used as the washing liquid. The sensible heat is dissipated by external, indirect cooling with water. Liquids deposited are removed from the system by a stripper. The gas mixture (temperature 35° C.) leaving the washing system, which has the following composition: $O_2$ 6.5% by volume, $SO_2$ 6.0% by volume, $NO_x$ 125 ppm, CH compounds <1 ppm, $H_2O$, $CO_2$ and $N_2$ 87.5% by volume, is after-cleaned (wet EGC) and dried with 97.5% by weight sulfuric acid.

It will be appreciated that the instant specification is set forth by way of illustration and not limitation, and that various modifications and changes may be made without departing from the spirit and scope of the present invention.

What is claimed is:

1. In the continuous production of oleum having a concentration of 10 to 45% by weight $SO_3$ or sulfuric acid having a concentration of 94 to 100% by weight $H_2SO_4$ by burning sulfur with atmospheric oxygen, cooling the resulting $SO_2$-containing gas to 390°–480° C., catalytically reacting the cooled gas to $SO_3$-containing gas on a vanadium-containing catalyst, absorbing the $SO_3$-containing gas after cooling and separating liquid from the gas after absorption, followed by recovering energy, the improvement which comprises effecting the burning of the sulfur with atmospheric oxygen in the presence of a dry $SO_2$-containing gas which contains from about 50 ppm up to about 5,000 ppm $(NO)_x$ expressed as NO.

2. A process according to claim 1, wherein the dry $SO_2$-containing gas which contains up to 5000 ppm $(NO)_x$ expressed as NO is dry cleavage gas from the thermal cleavage of waste sulfuric acid.

3. A process according to claim 2, wherein the dry cleavage gas contains 5 to 10% by volume $O_2$, 5 to 8% by volume $SO_2$, <200 ppm CO, <1,000 ppm $(NO)_x$, 50 ppm hydrocarbon compounds and 82 to 90% by volume $H_2O$, $N_2$ and $CO_2$.

4. A process according to claim 1, wherein the dry $SO_2$-containing gas which contains up to 5,000 ppm $(NO)_x$ comprises combustion gas from the burning of a sulfur-containing material.

5. A process according to claim 1, wherein the ratio between the quantity from the dry $SO_2$-containing gas and the quantity of $SO_2$ from the burning of sulfur is from 1:5 to 3:1.

6. A process according to claim 1, wherein the dry $SO_2$-containing gas which contains up to 5,000 ppm $(NO)_x$ is directly introduced into the furnace chamber where the sulfur is burnt.

7. A process according to claim 1, wherein the dry $SO_2$-containing gas is mixed with the atmospheric oxygen and the gas mixture is introduced into the furnace chamber where the sulfur is burnt.

8. A process according to claim 1, wherein the sulfur is burnt at a temperature in the range from 500° C. to 1,000° C., as measured at the exit of the furnace chamber before cooling of the gases.

9. A process according to claim 1, wherein the $SO_3$-containing gases are absorbed in oleum having a concentration of 15 to 40% by weight $SO_3$.

10. A process according to claim 1, wherein liquid is separated off from the gas after absorption and is recycled to a sulfuric acid processing plant.

11. A process according to claim 1, wherein the burning of the sulfur is effected in the presence of a dry $SO_2$-containing gas which contains less than 2,000 ppm $(NO)_x$ expressed as NO.

12. A process according to claim 1, wherein the sulfur is burnt at a temperature in the range from 700° C. to 950° C., as measured at the exit of the furnace chamber before cooling of the gases.

13. A process according to claim 1, wherein the $SO_3$-containing gases are absorbed in oleum having a concentration of 20 to 30% by weight $SO_3$.

14. A process according to claim 1, wherein liquid is separated off from the gas after absorption and is recycled to a sulfuric acid cleavage plant.

* * * * *

UNITED STATES PATENT AND TRADEMARK OFFICE
CERTIFICATE OF CORRECTION

PATENT NO.   : 5,389,354
DATED        : February 14, 1995
INVENTOR(S)  : Brandle, et al.

It is certified that error appears in the above-indentified patent and that said Letters Patent is hereby corrected as shown below:

Col. 6, line 30   Delete " absorptien " and substitute -- absorption --

Col. 6, line 41   Delete " gasels " and substitute -- gases --

Signed and Sealed this

Twenty-fifth Day of April, 1995

Attest:

BRUCE LEHMAN

*Attesting Officer*         Commissioner of Patents and Trademarks